(12) United States Patent
Natili et al.

(10) Patent No.: US 9,614,356 B2
(45) Date of Patent: Apr. 4, 2017

(54) MODULAR ACCESSORY SYSTEM FOR PANEL BOARD

(71) Applicant: EATON CORPORATION, Cleveland, OH (US)

(72) Inventors: Thomas Edward Natili, Butler, PA (US); Sandy Omar Jimenez, Monaca, PA (US); Richard Michael Elchik, Coraopolis, PA (US); Edward Ethber Lias, Aliquippa, PA (US)

(73) Assignee: EATON CORPORATION, Cleveland, OH (US)

( * ) Notice: Subject to any disclaimer, the term of this patent is extended or adjusted under 35 U.S.C. 154(b) by 159 days.

(21) Appl. No.: 14/476,271

(22) Filed: Sep. 3, 2014

(65) Prior Publication Data

US 2016/0064905 A1 Mar. 3, 2016

(51) Int. Cl.
| | | |
|---|---|---|
| H02B 1/015 | (2006.01) | |
| H02B 1/056 | (2006.01) | |
| H02B 1/04 | (2006.01) | |

(52) U.S. Cl.
CPC .......... *H02B 1/0565* (2013.01); *H02B 1/041* (2013.01)

(58) Field of Classification Search
CPC .......... H02B 1/015; H02B 1/15; H02B 1/056; H02B 1/0565; H02B 1/041–1/043; H01R 4/06; H01R 4/64; H01R 25/14; H01H 71/0228; H01H 71/0264; H01H 71/123
USPC ....... 361/601, 622, 627, 640, 641, 652, 644, 361/647, 673, 825, 614, 636; 200/50.2, 200/293, 294, 50.4, 295, 51.11; 218/155; 174/50, 67, 58, 72 B, 545, 59; 439/136–138, 535, 814, 651

See application file for complete search history.

(56) References Cited

U.S. PATENT DOCUMENTS

| | | | | |
|---|---|---|---|---|
| 2,576,396 | A * | 11/1951 | Green | F16B 5/00 248/240 |
| 2,805,294 | A * | 9/1957 | Edmunds | H02B 1/056 200/50.31 |
| 4,752,233 | A * | 6/1988 | Morby | H02B 1/056 361/636 |
| 4,870,531 | A * | 9/1989 | Danek | H01H 71/0228 335/18 |
| 5,184,278 | A * | 2/1993 | Jordan | H02B 1/056 361/627 |
| 5,303,113 | A * | 4/1994 | Goleman | H01H 71/123 307/91 |
| 5,894,404 | A * | 4/1999 | Vrnak | H01H 71/0264 174/545 |
| 6,813,142 | B1 * | 11/2004 | Seff | H02B 1/056 361/637 |
| 7,286,340 | B2 * | 10/2007 | Karim | H02B 1/042 200/294 |

(Continued)

*Primary Examiner* — Robert J Hoffberg
(74) *Attorney, Agent, or Firm* — Eckert Seamans; Stephen Bucchianeri; Grant Coffield

(57) ABSTRACT

A modular accessory system is structured to be mounted in a panel board including a housing assembly and a number of conductors with each conductor having a number of stabs extending therefrom. The modular accessory system includes an interface assembly structured to be selectively coupled to the panel board and a number of modules disposed on the interface assembly. Each module is structured to at least monitor or regulate one or more attributes of the panel board.

13 Claims, 7 Drawing Sheets

(56) References Cited

U.S. PATENT DOCUMENTS

| | | | | |
|---|---|---|---|---|
| 7,449,645 B1* | 11/2008 | Flegel | ...................... | H01R 4/64 |
| | | | | 200/50.32 |
| 7,957,122 B2* | 6/2011 | Sharp | ..................... | H02B 1/056 |
| | | | | 174/67 |
| 8,482,905 B2* | 7/2013 | Mooney | ................... | H01H 9/26 |
| | | | | 361/634 |
| 8,564,923 B2* | 10/2013 | Carlino | .............. | H01H 71/0228 |
| | | | | 361/115 |
| 8,873,223 B2* | 10/2014 | Rahn | ................... | H02B 1/0565 |
| | | | | 200/50.21 |
| 8,968,039 B1* | 3/2015 | Whipple | .............. | H01R 9/2408 |
| | | | | 439/814 |
| 9,267,522 B2* | 2/2016 | Whipple | ................... | H02J 1/00 |
| 2002/0064021 A1* | 5/2002 | Rane | ................ | H01H 71/0228 |
| | | | | 361/673 |
| 2008/0153325 A1* | 6/2008 | Boileau | ................... | H01R 4/06 |
| | | | | 439/75 |

\* cited by examiner

MODULAR ACCESSORY SYSTEM FOR PANEL BOARD

CROSS-REFERENCE TO RELATED APPLICATIONS

The present application is related to commonly assigned U.S. patent application Ser. No. 14/024,664, now issued as U.S. Pat. No. 9,267,522, and Ser. No. 14/024,658, now issued as U.S. Pat. No. 8,968,031, which are hereby incorporated by reference.

BACKGROUND OF THE INVENTION

Field of the Invention

The disclosed and claimed concept relates to a panel board and, more specifically, to a modular accessory system for a panel board. The concept further relates to an interface assembly for a modular accessory system and to modules for use in a modular accessory system.

Background Information

A panel board, or other type of load center, includes a number of conductive members disposed in a housing assembly defining an enclosure. The conductive members include "stabs" to which a panel board device, such as, but not limited to, a circuit breaker, is attached. That is, the conductive members, as shown, are planar members and the stab is a generally planar tab extending generally perpendicular thereto. A panel board device includes a conductive spring clip that engages the stab and thereby couples the panel board device to the conductive member. Common examples of such panel board devices include, for example, 120 volt and 120/240 volt circuit breakers.

In improving the utility/functionality of panel boards, devices have been developed which engage the conductive members of a panel board via a circuit breaker or breaker-like device but utilize components housed either elsewhere within the enclosure of the panel board or external to the enclosure via a "knockout" passageway provided through the enclosure. Such devices are commonly used to provide surge protection, current monitoring, or other functionality to the panel board.

While the functionality provided by such additional devices is desirable in many applications the additional space required is generally undesirable and/or unavailable.

There is, therefore a need for a system for providing such improved utility/functionality to panel boards which may be readily integrated with existing applications while requiring a minimal amount of space.

SUMMARY OF THE INVENTION

These needs, and others, are met by at least one embodiment of the disclosed concept. As one aspect of the disclosed concept a modular accessory system structured to be mounted in a panel board including a housing assembly and a number of conductors, each conductor including a number of stabs, is provided. The modular accessory system comprises: an interface assembly structured to be selectively coupled to the panel board and a number of modules disposed on the interface assembly. Each module is structured to at least monitor or regulate one or more attributes of the panel board.

The interface assembly may comprise a number of fastening mechanisms, each fastening mechanism being structured to selectively couple the interface assembly to the panel board.

Each module of the number of modules may be selectively coupled to the interface assembly.

A portion of each module of the number of modules may cooperatively engage a corresponding portion of the interface assembly.

The interface assembly may be formed from at least one of: urea, glass polyester, or thermoplastic.

One of the number of modules may be structured to detect an electrical surge in the panel board.

One of the number of modules may be structured to detect a loss of neutral in the panel board.

At least one of the modules may comprise a user interface including a visual display.

The number of modules may comprise two modules.

The number of modules may comprise three modules.

The number of modules may comprise four modules.

As another aspect of the disclosed concept an interface assembly structured to be mounted in a panel board including a housing assembly and a number of conductors, each said conductor including a number of stabs, is provided. The interface assembly comprises: a body including a number of mechanisms structured to selectively couple the body to the panel board and a portion structured to cooperatively engage a number of modules.

As a further aspect of the disclosed concept, a module for use in a modular accessory system is provided. The module comprises: a housing structured to be coupled to an interface assembly which is coupled to a panel board; and circuitry disposed in the housing, the circuitry being structured to at least monitor or regulate one or more attributes of the panel board.

The module may further comprise a user interface including a visual display.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
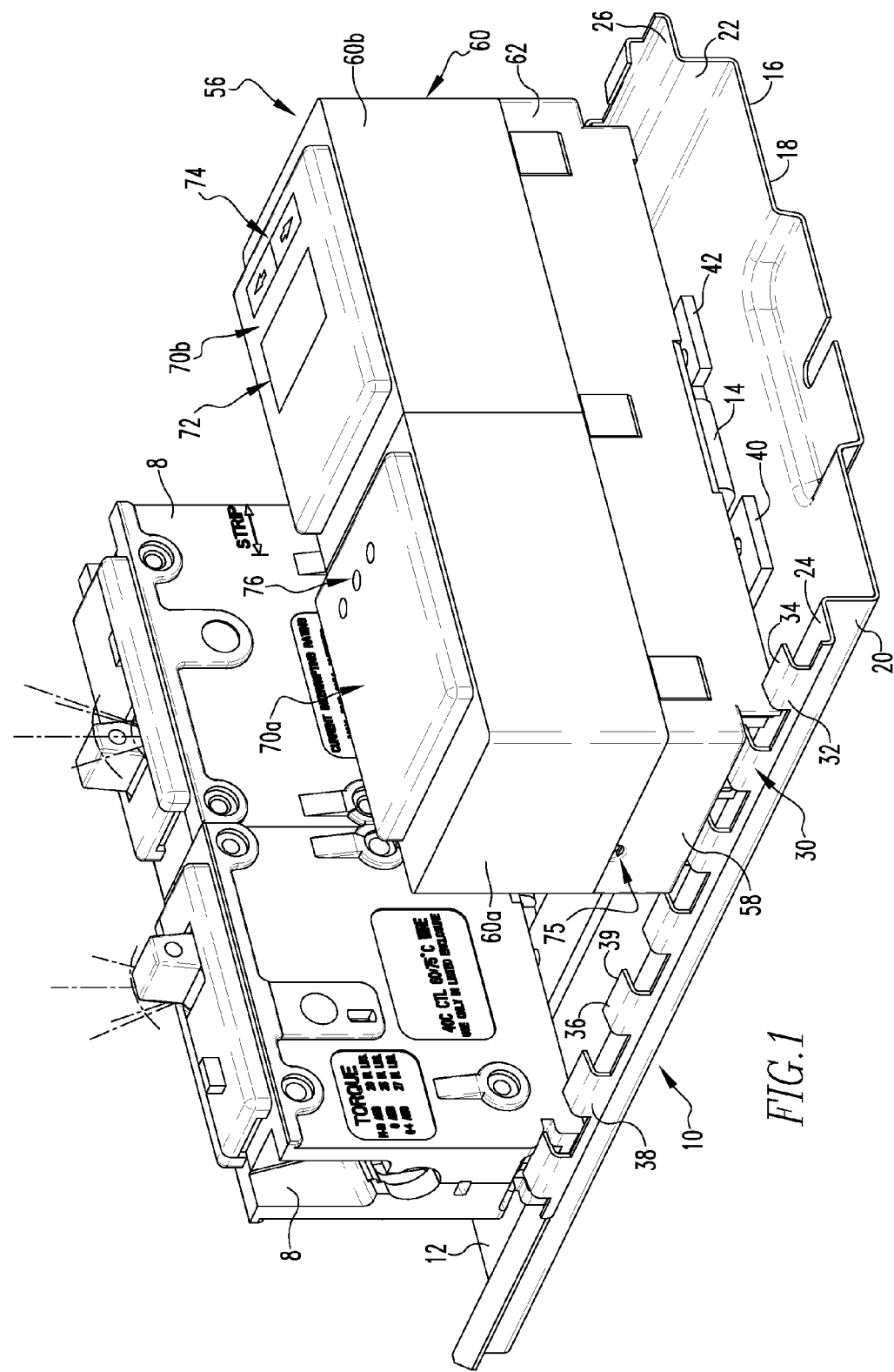
FIG. 1 is an isometric view of a portion of a panel board including a modular accessory system in accordance with an example embodiment of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "selectively coupled" means that two components are coupled in a manner which may be readily undone such that the components may be readily uncoupled. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise coupled thereto. That is, for example, a book resting on a table is not coupled thereto, but a book glued to a table is coupled thereto.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, the statement that two or more parts or components "engage" one another shall mean that the elements exert a force or bias against one another either directly or through one or more intermediate elements or components.

As used herein, "secure" and/or "lock" means that a coupling utilizes two components, one stationary and one movable and wherein the movable component rotates or slides between a first position, wherein the movable component does not engage the stationary component and a second position, wherein the movable component engages the stationary component. It is noted that a lock assembly, such as but not limited to a deadbolt on a door, meets this definition in that the deadbolt only performs the locking function when an attempt is made to open the door and the deadbolt engages the latch plate. It is further noted that a coupling such as a spring clip does not secure" and/or "lock" elements together as it flexes between a first and second position.

As used herein, an "easy release" locking coupling is a coupling wherein the movable component can be decoupled from the stationary component with a minimal motion such as, but not limited to, a rotational motion of about 180 degrees or less. Further, the identified range is the range intended for the movable component. That is, the fact that a bolt may be inserted into a nut by half a turn does not make a bolt and a nut an "easy release" locking coupling and as used herein, a bolt and a nut are specifically excluded from the definition of an "easy release" locking coupling.

As used herein, the word "unitary" means a component is created as a single piece or unit. That is, a component that includes pieces that are created separately and then coupled together as a unit is not a "unitary" component or body.

As used herein, the term "number" shall mean one or an integer greater than one (i.e., a plurality).

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening are made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit. Further, as used herein, "loosely correspond" means that a slot or opening is sized to be larger than an element disposed therein. This means that the increased size of the slot or opening is intentional and is more than a manufacturing tolerance. Further, with regard to a surface formed by two or more elements, a "corresponding" shape means that surface features, e.g. curvature, are similar.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies.

As used herein, "attributes of the panel board" means one or more details or characteristics of or related to the panel board that may be monitored and or controlled by modules in accordance with the disclosed concept.

As used herein, "at" means on or near.

Figure 2:
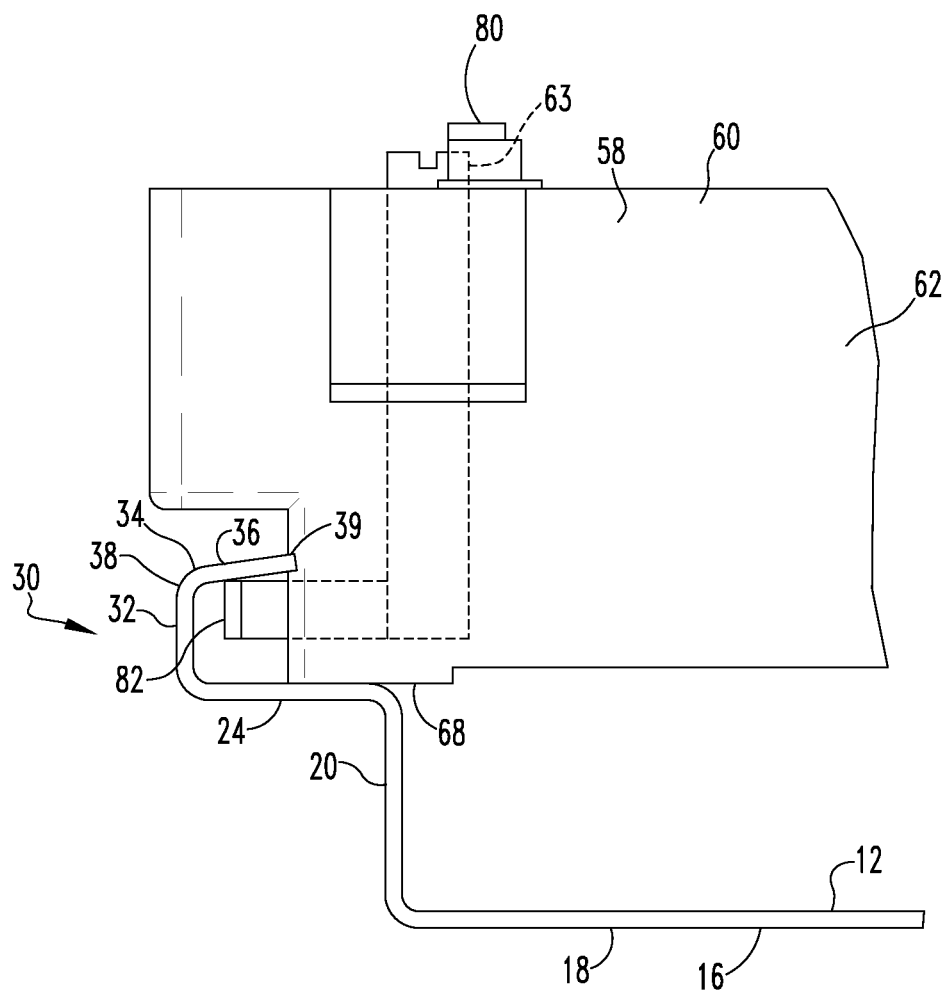
FIG. 2 is a detail end view of a portion of a panel board and interface assembly of a modular accessory system in accordance with an example embodiment of the disclosed concept.

Referring to FIGS. 1 and 2, an exemplary embodiment of a panel board 10 in accordance with an example embodiment of the disclosed concept is shown. Panel board 10 is an assembly including a housing assembly 12 (shown in part) and a number of conductive members 14. In an exemplary embodiment, the housing assembly 12 is made of metal. As is known, the housing assembly 12 includes a number of sidewalls, including a door (not shown), that define an enclosed space. As shown, the housing assembly 12 includes a back plate 16. The back plate 16 is a generally planar body 18 that further includes generally planar peripheral flanges 20, 22 that are spaced apart and extend generally perpendicular to the plane of the back plate body 18. The peripheral flanges 20, 22 in turn include outwardly extending flanges 24, 26 that extend generally perpendicular to the plane of the associated peripheral flanges 20, 22. Each outwardly extending flange 24, 26 includes a number of mounting constructs 30. Each mounting construct 30 includes a spacer member 32 and a mounting tab 34. Each spacer member 32 extends generally perpendicular to the plane of the associated outwardly extending flange 24, 26 and generally parallel to the plane of the associated peripheral flanges 20, 22. Each mounting tab 34 is a generally planar member 36 extending over, and generally parallel to the plane of, the associated outwardly extending flanges 24, 26, and, generally perpendicular to the plane of the spacer member 32 from which it depends. That is, each mounting tab planar member 36 includes a proximal end 38 and a distal end 39. Each tab proximal end 38 is flexibly coupled to the associated spacer member 32, or stated broadly, flexibly coupled to the panel board housing assembly back plate 16. In this configuration, each mounting tab 34 moves between a non-flexed, first position, wherein the mounting tab 34 extends generally parallel to the plane of the back plate 16 of the panel board housing assembly, and a flexed, second position (such as shown in FIG. 2) wherein the mounting tab 34 is generally angled relative to the plane of the panel board housing assembly back plate 16. When disposed in the second position, each mounting tab 34 generally creates a bias generally toward back plate 16.

Figure 3:
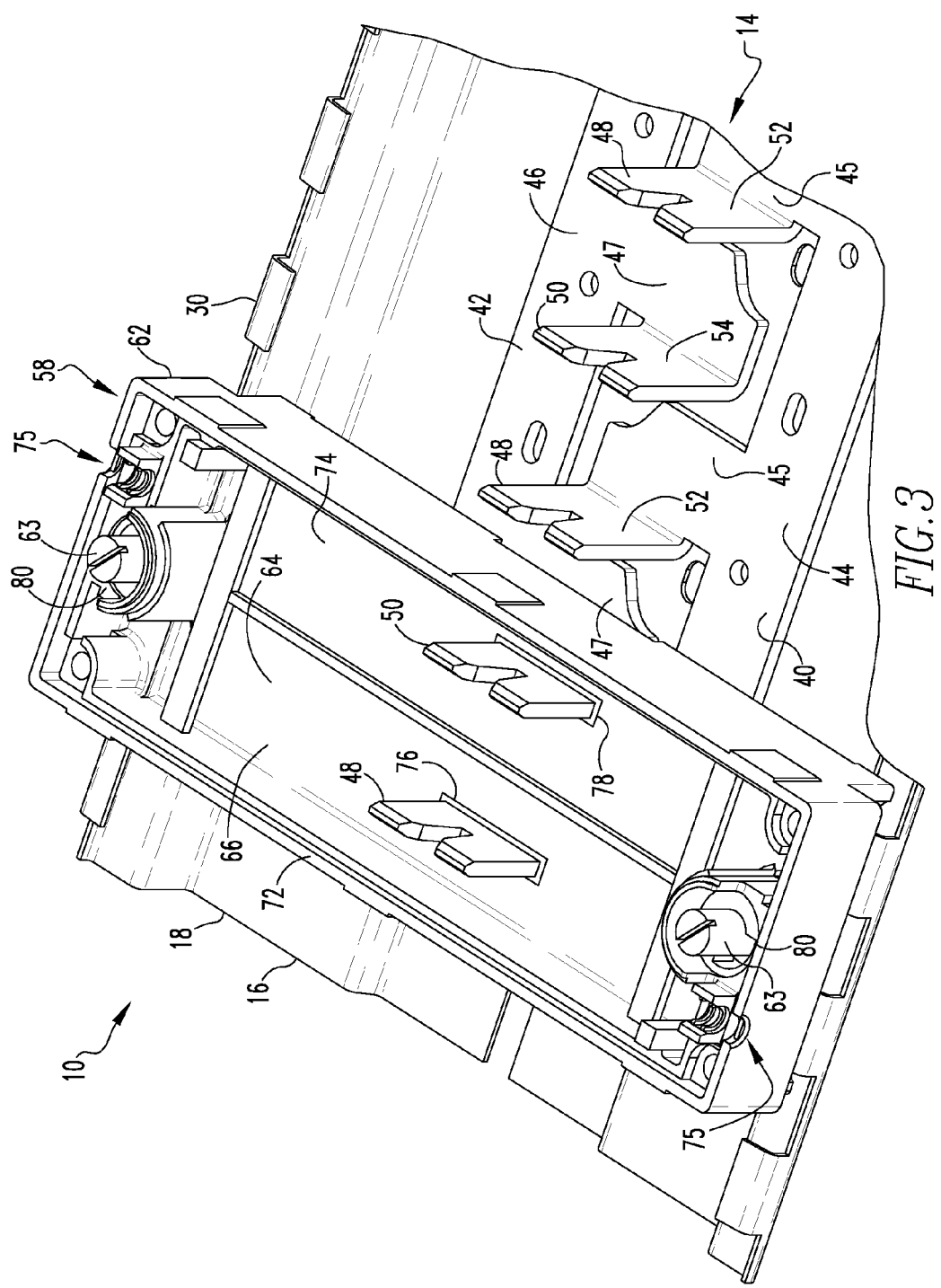
FIG. 3 is a detail isometric view of a portion of a panel board and an interface assembly of a modular accessory system in accordance with an example embodiment of the disclosed concept.

In an exemplary embodiment, the number of conductive members 14 include a first phase conductor 40 and a second phase conductor 42. As shown in FIG. 3, the first phase conductor 40 and second phase conductor 42 each include generally planar portions 44, 46 that are disposed in generally the same plane. A non-conductive barrier (not shown) optionally may be disposed between the first phase conductor 40 and second phase conductor 42. The first phase conductor 40 and second phase conductor 42 each include a number of stabs 48, 50. Each stab 48, 50 includes a planar body 52, 54, that extends generally perpendicular to the plane of the first phase conductor 40 and second phase conductor 42. In an exemplary embodiment, the first phase conductor planar portion 44 has a number of spaced lateral protrusions 45 from which each stab 48 extends, and the second phase conductor planar portion 46 has a number of spaced lateral protrusions 47 from which each stab 50 extends. Such arrangement providing for the first phase conductor lateral protrusions 45 and the second phase conductor lateral protrusions 47 to generally interlace (while still being separated a suitable distance) such that first phase conductor stabs 48 and second phase conductor stabs 50 are generally aligned and spaced from each other in an alternating arrangement.

Figure 4:
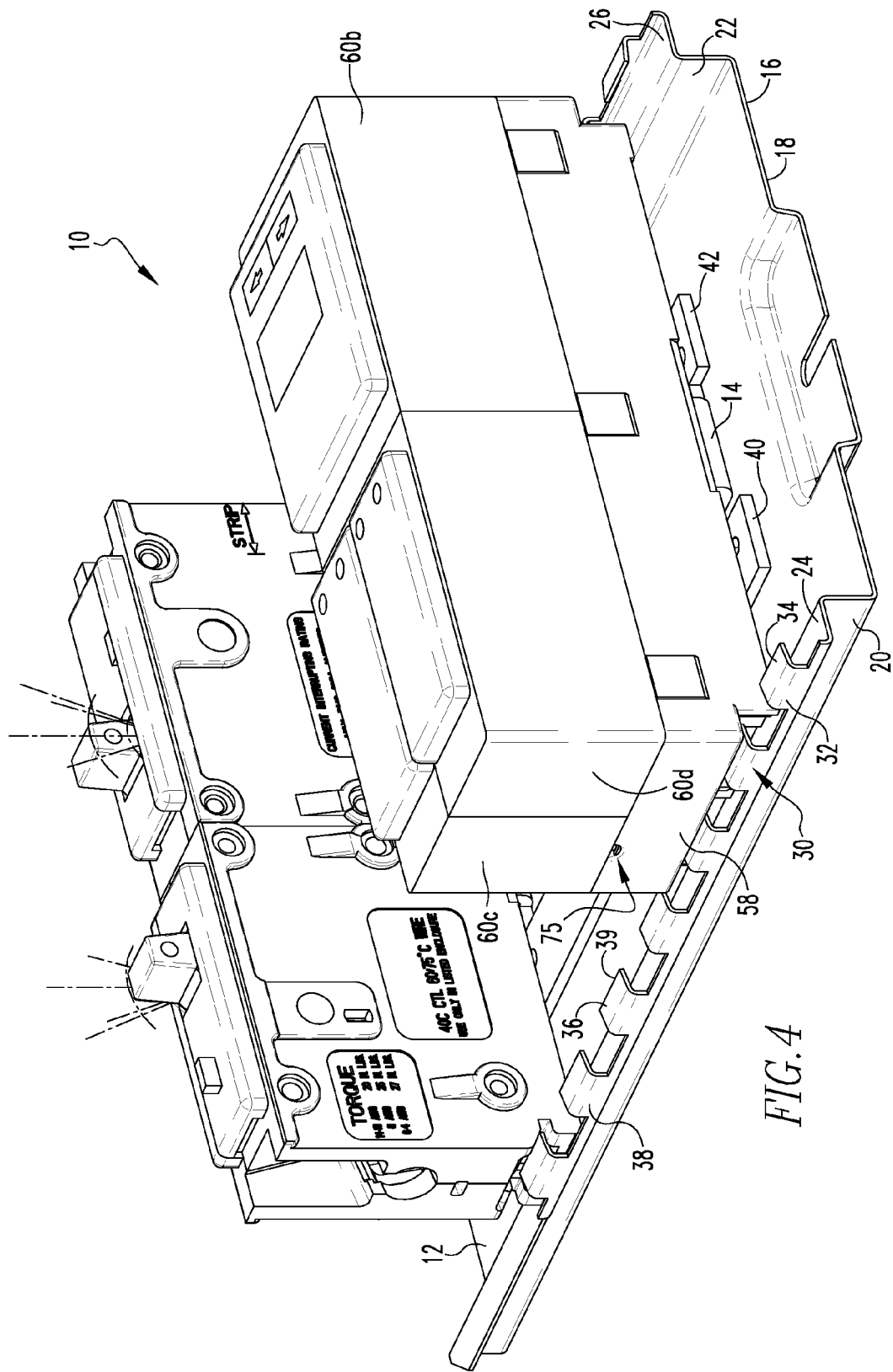
FIG. 4 is an isometric view of a portion of a panel board including a modular accessory system in accordance with another example embodiment of the disclosed concept.
Figure 5:
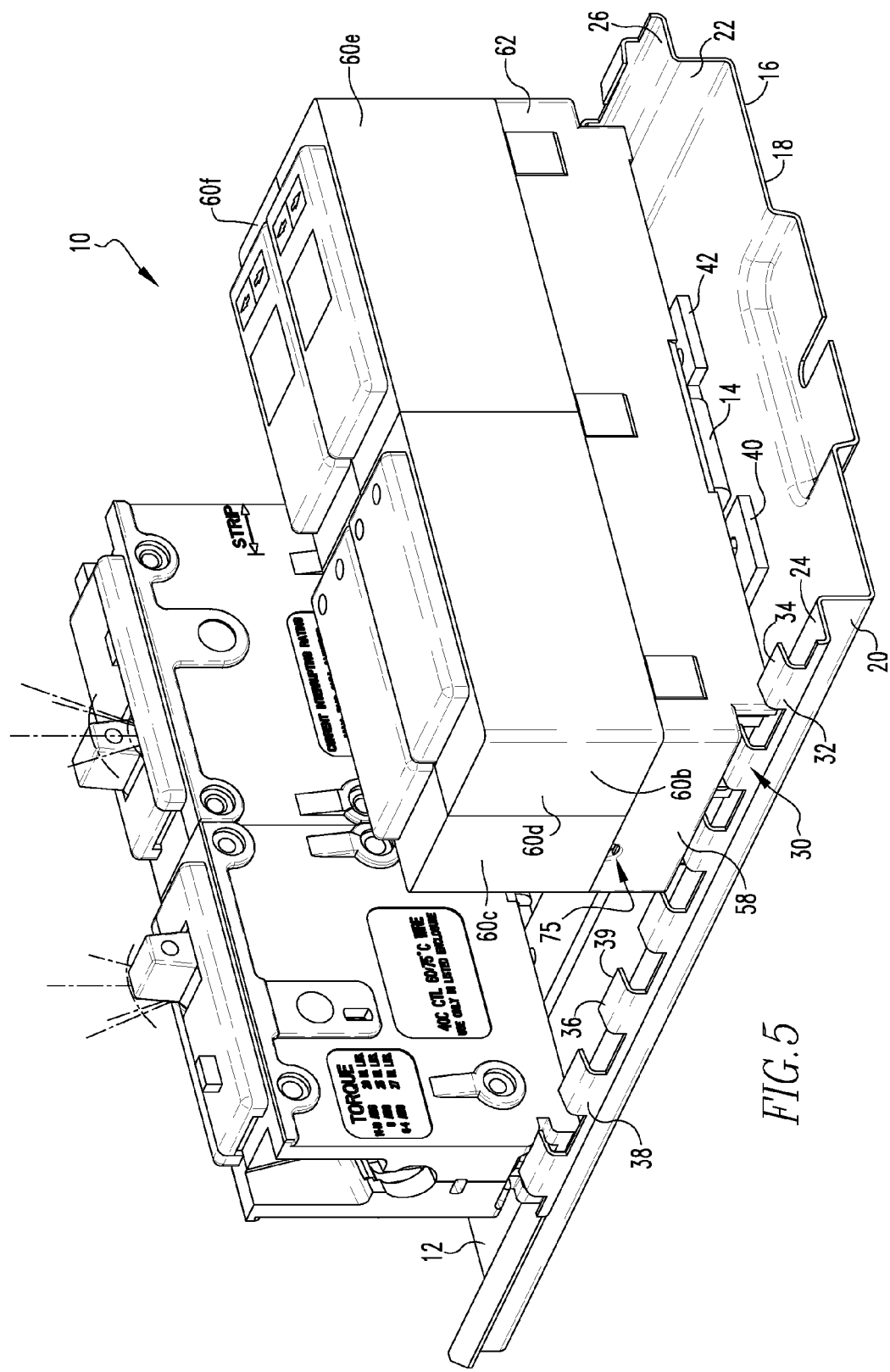
FIG. 5 is an isometric view of a portion of a panel board including a modular accessory system in accordance with yet another example embodiment of the disclosed concept.

Referring again to FIG. 1, a modular accessory system 56 according to an example embodiment of the disclosed concept is shown installed on panel board 10 along with a pair of known circuit breakers 8. Modular accessory system 56 includes an interface assembly 58 and a number of modules 60 (two modules 60a and 60b are shown) selectively coupled thereto. Although shown installed on panel board 10, it is to be appreciated that the present concept may be employed with panel boards of other constructs without varying from the breadth of the disclosed concept. It is also to be appreciated that although shown with two modules 60a and 60b, the quantity of modules may be varied without varying from the breadth of the disclosed concept. For example, without limitation, FIG. 4 shows an embodiment having 3 modules 60b, 60c, 60d, and FIG. 5 shows an embodiment having 4 modules 60c, 60d, 60e, 60f.

Referring to FIGS. 1-3, interface assembly 58 is structured to be selectively coupled to a panel board (e.g., without limitation, panel board 10) and support a number of modules 60 (modules 60a and 60b) thereon and in electrical communication with one or more of the phase conductors (e.g., first and/or second phase conductors 40, 42) of the panel board.

As shown in FIGS. 2 and 3, in an exemplary embodiment, the interface assembly 58 includes a body 62, and a number of locking member assemblies 63 (FIG. 3) for securing the interface assembly 58 to panel board 10 (as discussed in further detail below). In an exemplary embodiment, the interface assembly body 62 is made from a non-conductive material (e.g., without limitation, urea, glass polyester, thermoplastic, or other suitable material). In an exemplary embodiment, the interface assembly body 62 includes an elongated, generally planar bottom member 64 having a front side 66 and a back side (not numbered).

In an exemplary embodiment, the interface assembly body 62 is generally rectangular and includes a flange 72 extending perpendicularly from and about the interface assembly body planar member 64, thereby defining a support compartment 74 in the interface assembly body 62. The interface assembly body 62 further includes a number of passages or apertures 76, 78 defined/formed in the planar member 64. Such apertures are positioned such that respective stabs 48, 50 of first and second phase conductors 40, 42 may extend through planar member 64 and into support compartment 74 where they are then cooperatively engaged by corresponding electrical terminals of suitable shape on each of the modules 60 that are selectively coupled to the interface assembly 58. In such exemplary embodiment connections between the modules 60 and the neutral conductor (not shown) of the panel board 10 are made via wiring connections which would pass through notches 75 provided in the interface assembly body 62.

In an exemplary embodiment such as shown in FIG. 3, the interface assembly body 62 is structured to be secured to a panel board housing assembly 12 by the locking member assemblies 63. The locking member assemblies 63 are each disposed in a mounting passage 80. Each mounting passage 80, in an exemplary embodiment, is generally circular and extends generally perpendicular to the plane of the interface assembly body planar member 64. Each locking member assembly 63 includes a radially projecting member 82 (FIG. 2) which is structured to selectively move between first and second positions upon rotation of locking member assembly 63 (e.g., without limitation, via a screwdriver). In such first position (not shown), radially projecting member 82 is generally retracted within interface assembly body 62. In such second position, such as shown in the side view of FIG. 2, radially projecting member 82 generally extends from interface assembly body 62 in a manner such that radially projecting member 82 engages the planar member 36 of a mounting tab 34 of panel board 10. As a result of such engagement between radially projecting member 82 and mounting tab 34, the interface assembly body 62, and thus the modular accessory system 56 (FIG. 1) is selectively coupled to panel board 10. A more detailed description of a suitable locking member assembly for selectively coupling interface assembly body 62 to panel board 10 is described in commonly assigned U.S. patent application Ser. No. 14/024, 664 which, as previously provided, has been incorporated by reference herein. Although particular examples are provided herein, it is to be appreciated that such examples are provided for exemplary purposes only and are not intended to be limiting upon the scope of the disclosed concept as other suitable mechanisms may be employed to selectively couple the interface assembly body 62 to panel board 10 without varying from the scope of the disclosed concept.

Figure 6:
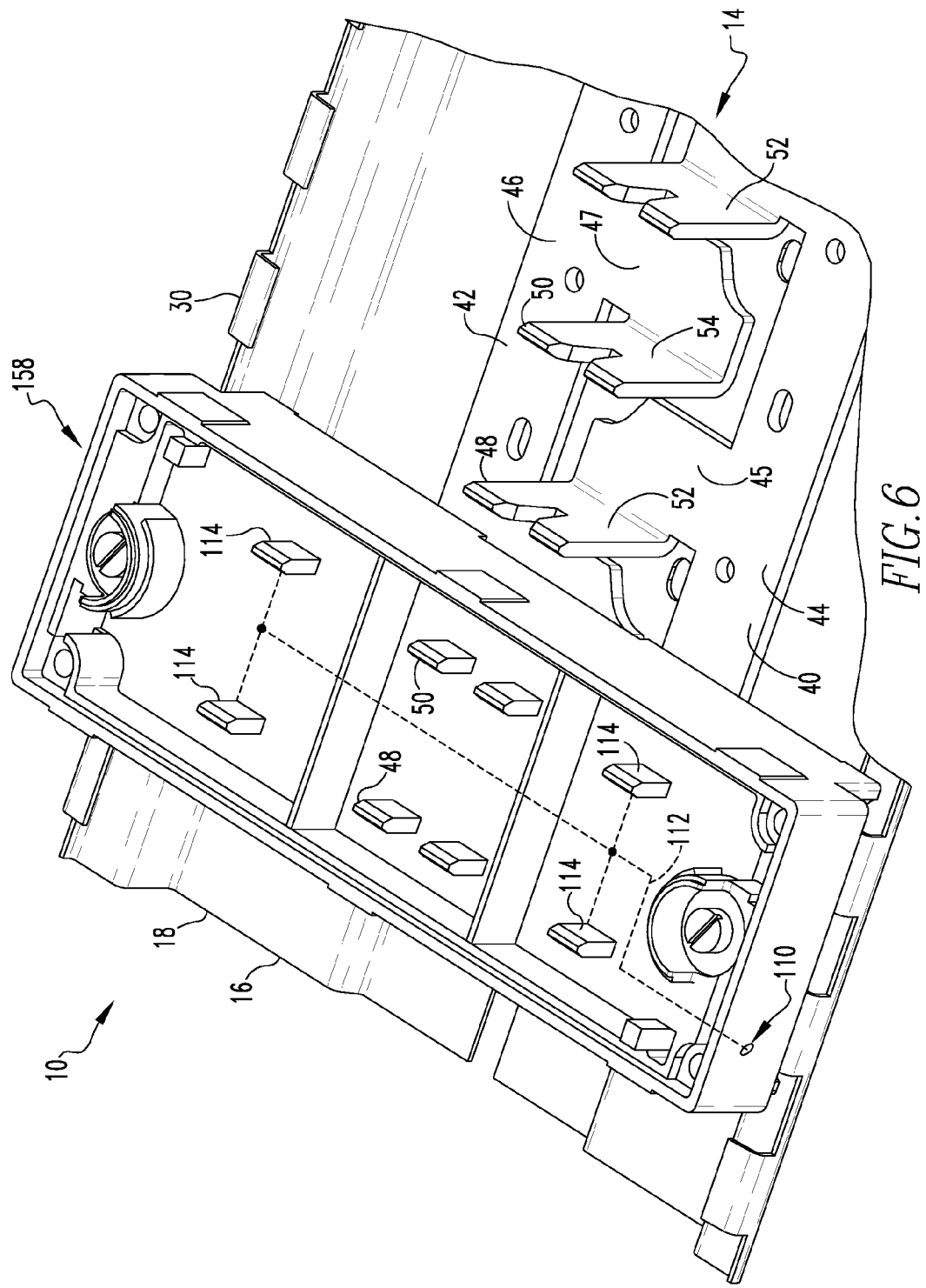
FIG. 6 is a detail isometric view of a portion of a panel board and an interface assembly of a modular accessory system in accordance with another example embodiment of the disclosed concept.
Figure 7:
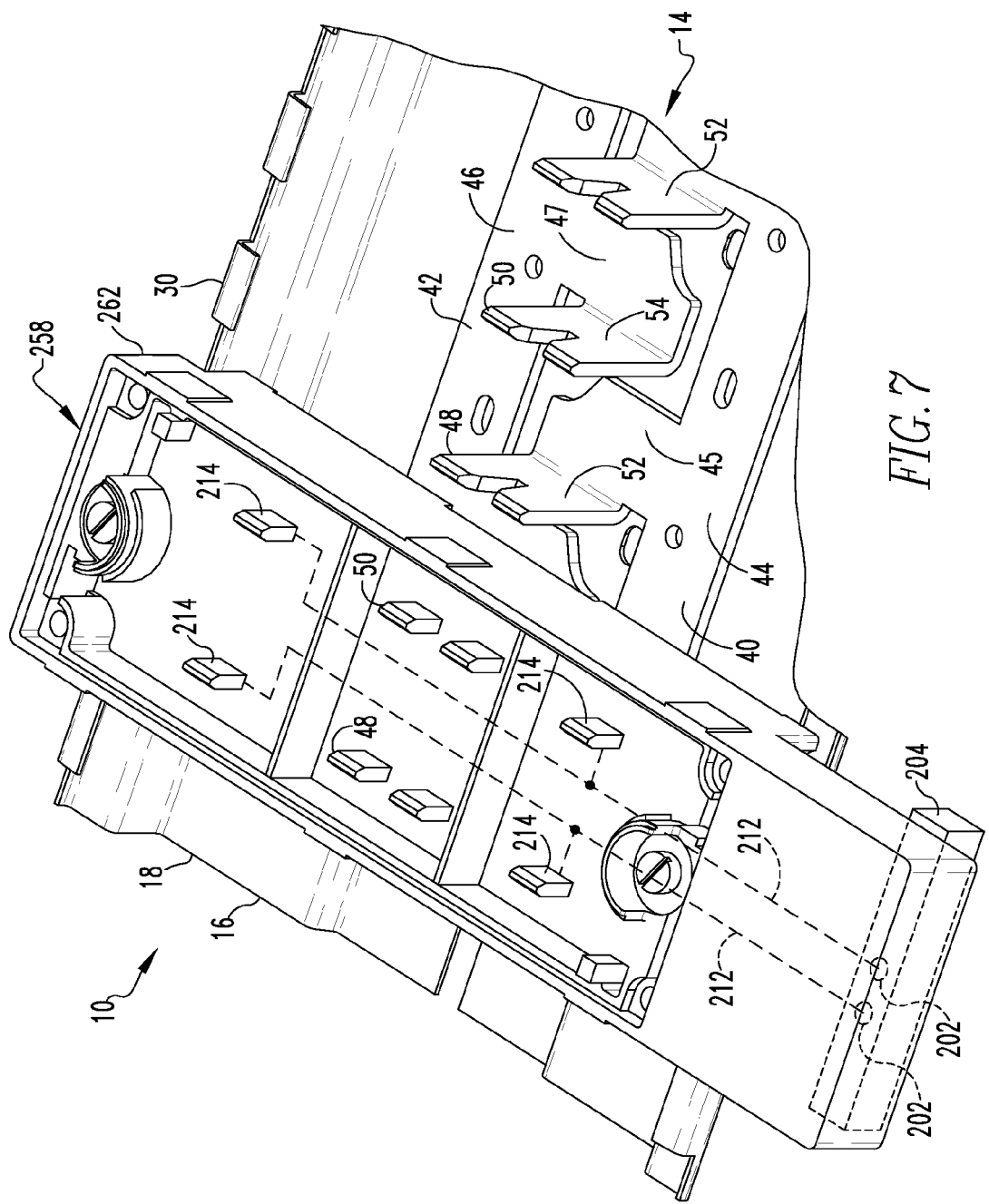
FIG. 7 is a detail isometric view of a portion of a panel board and an interface assembly of a modular accessory system in accordance with yet another example embodiment of the disclosed concept.

FIGS. 6 and 7 show additional embodiments of interface assemblies 158 and 258 in accordance with the disclosed concept which function in a similar manner to interface assembly 58 previously described with slight variations. For example, referring to FIG. 6, interface assembly 158 includes an electrical interface 110 which is adapted to be electrically coupled (e.g., via a wired connection) to the neutral conductor (not shown) of the panel board 10. As shown schematically via dashed lines 112, the electrical interface 110 is electrically coupled to a number of electrical terminals 114 provided on interface assembly 158 for engagement by corresponding electrical terminals provided on modules 60 provided on the interface assembly 158.

Referring to FIG. 7, in another exemplary embodiment, the body 262 of the interface assembly 258 may extend in a manner such that a number of electrical terminals 202 (two are shown schematically) provided on an underside of the body 262 electrically engage the neutral conductor 204 of the panel board 10. As shown schematically via dashed lines 212, each electrical terminal of the number of electrical terminals 212 is electrically coupled to a number of electrical terminals 214 provided on interface assembly 258 for engagement by corresponding electrical terminals provided on modules 60 provided on the interface assembly 258.

It is to be appreciated that other variations of the interface assembly in addition to the exemplary embodiments described herein are encompassed by the breadth of the disclosed concept. For example, although the exemplary embodiments described herein all employ arrangements in which stabs 48 and 50 of panel board 10 generally pass through the interface assembly 58, 158, 258, it is to be appreciated that additional or alternate electrical terminals may be provided on the interface assembly for electrical engagement with the module(s). In such instances, a suitable arrangement of electrical conductors is provided in or on the interface assembly such that the additional or alternate electrical terminals are in electrical communication with one or more of stabs 48 and 50 of the panel board 10 when the interface assembly is coupled to the panel board 10.

Having thus described the basic structure of interface assemblies 58, 158, 258 in accordance with the disclosed concept, a description of some exemplary embodiments of modules 60 for use therewith will now be provided. Referring again to FIG. 1, modular accessory system 56 includes a first module 60*a* and a second module 60*b* provided thereon in a manner such that a lower portion (not numbered) of each module 60 generally cooperatively engages a portion (not numbered) of the interface assembly 58. Such modules 60 may be selectively coupled directly to the interface assembly 58 via any suitable means and/or may be generally retained in place through the engagement (e.g., without limitation, frictional) between electrical terminals (not shown) provided on each module and one or more of the stabs 48, 50 of the panel board 10. Each module 60 may include suitable components for monitoring and or regulating one or more attributes of the panel board. Some examples of suitable devices include, without limitation, surge devices with overvoltage protection, AF/GF (arc fault/ground fault) diagnostic, automatic transfer switch, smart breakers, atmospheric monitoring, vehicle charging, DC source for lighting, and wireless communications.

A particular example of a module 60 that may be employed in accordance with the disclosed concept is a surge protection module. Such module is a "double module", such as module 60*b* shown in FIG. 1. Such surge module is constructed to protect first and second phase conductors 40, 42 as well as neutral and ground connections to the panel board 10 from incoming surges on the load side of the utility meter. Such surge module may also be constructed to protect all branch circuits that extend from the load center. In an exemplary embodiment, the surge protection module may be configured to provide an event counter designed to display the number of surges the module has experienced. In such embodiment, the surge module may include a user interface 70*b* including features such as a visual display (e.g., without limitation, LCD display 72) with reset and scroll options.

Another example of a module 60 that may be employed in accordance with the disclosed concept is a loss of neutral detection module. Like modules 60*a* and 60*b* of FIG. 1, such module is a double module with an interface to the main circuit breaker (not shown). The interface to the main circuit breaker is a shunt trip device that is installed into the main as an accessory. With the shunt trip being coupled to the module a detection of loss of neutral would trigger the shunt trip, thus tripping the main breaker. By tripping the main breaker, higher voltages would not be applied to the sensitive electronic loads in the structure which is fed by the panel board 10. This type of phenomena, although not typical, can cause one phase to reach up to 240 volts.

A further example of a module 60 that may be employed in accordance with the disclosed concept provides for over temperature or atmospheric monitoring in employing as arrangement similar to that described in U.S. Pat. No. 7,187,529, the contents of which is incorporated by reference herein. Such module would once again be a double module and would provide an indication to the user either by shutting off the main breaker or by using an audible indicator that the load center is under duress by over temperature such as caused, for example, without limitation, by a fire.

Another example of a module 60 that may be employed in accordance with the disclosed concept provides for whole house energy monitoring. A double module is once again employed in such embodiment for monitoring power draw of the entire load center. In an exemplary embodiment, interface to the user would be provided such as LCD screen 72 and buttons 74 for scrolling through menu options provided in the LCD screen 72. One such option would be to continuously display the Kwh (Kilowatt hour) usage, which is the unit of measure preferred by electric companies. As some users may not be comfortable accessing such information via the load center, in another exemplary embodiment a wireless transmitter is used for transmitting information from the module to a HUB or router so that the user can access the energy usage information at their leisure. Such wireless transmitter may be provided in the module itself or provided as a separate unit wired to the module which may be installed external to the housing of the panel board 10 in order to reduce potential interference and increase the range of the wireless transmitter.

In view of the foregoing, it is to be appreciated that one or both of the amount or type of modules which may be employed in a modular accessory system in accordance with the disclosed concept is only limited by the technology and the imagination of the technician and thus embodiments in accordance with the disclosed concept may be utilized in a wide range of applications. Further, user interfaces (e.g., 70a, 70b) of such modules may be provided with indicators (e.g., without limitation LEDs 76) or other output or input devices applicable to the function of the particular module associated therewith. Accordingly, it is to be readily appreciated that the particular arrangements provided herein are given for exemplary purposes only and are not intended to limit the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A modular accessory system structured to be mounted in a panel board, the panel board including a housing assembly and a number of conductors, each of the conductors including a number of stabs, the housing assembly having a plurality of mounting constructs for securing circuit breakers to the housing assembly, the modular accessory system comprising:
    an interface assembly comprising a number of fastening mechanisms, each of the fastening mechanisms structured to engage one of the mounting constructs in a manner that selectively couples the interface assembly to the panel board; and
    a number of modules disposed on the interface assembly, each of the modules being structured to at least monitor or regulate one or more attributes of the panel board.

2. The modular accessory system of claim 1, wherein each of the modules is selectively coupled to the interface assembly.

3. The modular accessory system of claim 1, wherein a portion of each of the modules cooperatively engages a corresponding portion of the interface assembly.

4. The modular accessory system of claim 1, wherein at least a portion of the interface assembly is formed from at least one of: urea, glass polyester, or thermoplastic.

5. The modular accessory system of claim 1, wherein one of the modules is structured to detect an electrical surge in the panel board.

6. The modular accessory system of claim 1, wherein one of the modules is structured to detect a loss of neutral in the panel board.

7. The modular accessory system of claim 1, wherein at least one of the modules comprises a user interface including a visual display.

8. The modular accessory system of claim 1, wherein the number of modules comprises two modules.

9. The modular accessory system of claim 1, wherein the number of modules comprises three modules.

10. The modular accessory system of claim 1, wherein the number of modules comprises four modules.

11. An interface assembly structured to be mounted in a panel board, the panel board including a housing assembly and a number of conductors, each of the conductors including a number of stabs, the housing assembly having a plurality of mounting constructs for securing circuit breakers to the housing assembly, the interface assembly comprising:
    a body including a portion structured to cooperatively engage a number of modules; and
    a number of fastening mechanisms, each of the fastening mechanisms structured to engage one of the mounting constructs in a manner that selectively couples the body to the panel board.

12. A module for use in a modular accessory system mounted in a panel board, the panel board including a panel housing assembly and a number of panel conductors, each of the panel conductors including a number of stabs, the panel housing assembly having a plurality of mounting constructs for securing circuit breakers to the panel housing assembly, the module comprising:
    a module housing structured to be selectively coupled to an interface assembly as recited in claim 11, the interface assembly including a number of fastening mechanisms, each of the fastening mechanisms structured to engage one of the mounting constructs in a manner that selectively couples the interface module to the panel board;
    a number of electrical conductors mounted on the module housing, each of the electrical conductors being structured to cooperatively engage one of the stabs of one of the panel conductors of the panel board; and
    circuitry disposed in the module housing in electrical communication with the electrical conductors, the circuitry being structured to at least monitor or regulate one or more attributes of the panel board.

13. The module of claim 12, further comprising a user interface including a visual display.

* * * * *